June 19, 1928. 1,674,394
C. T. HANSEN
VEHICLE BODY CONSTRUCTION
Filed Oct. 9, 1924 7 Sheets-Sheet 1
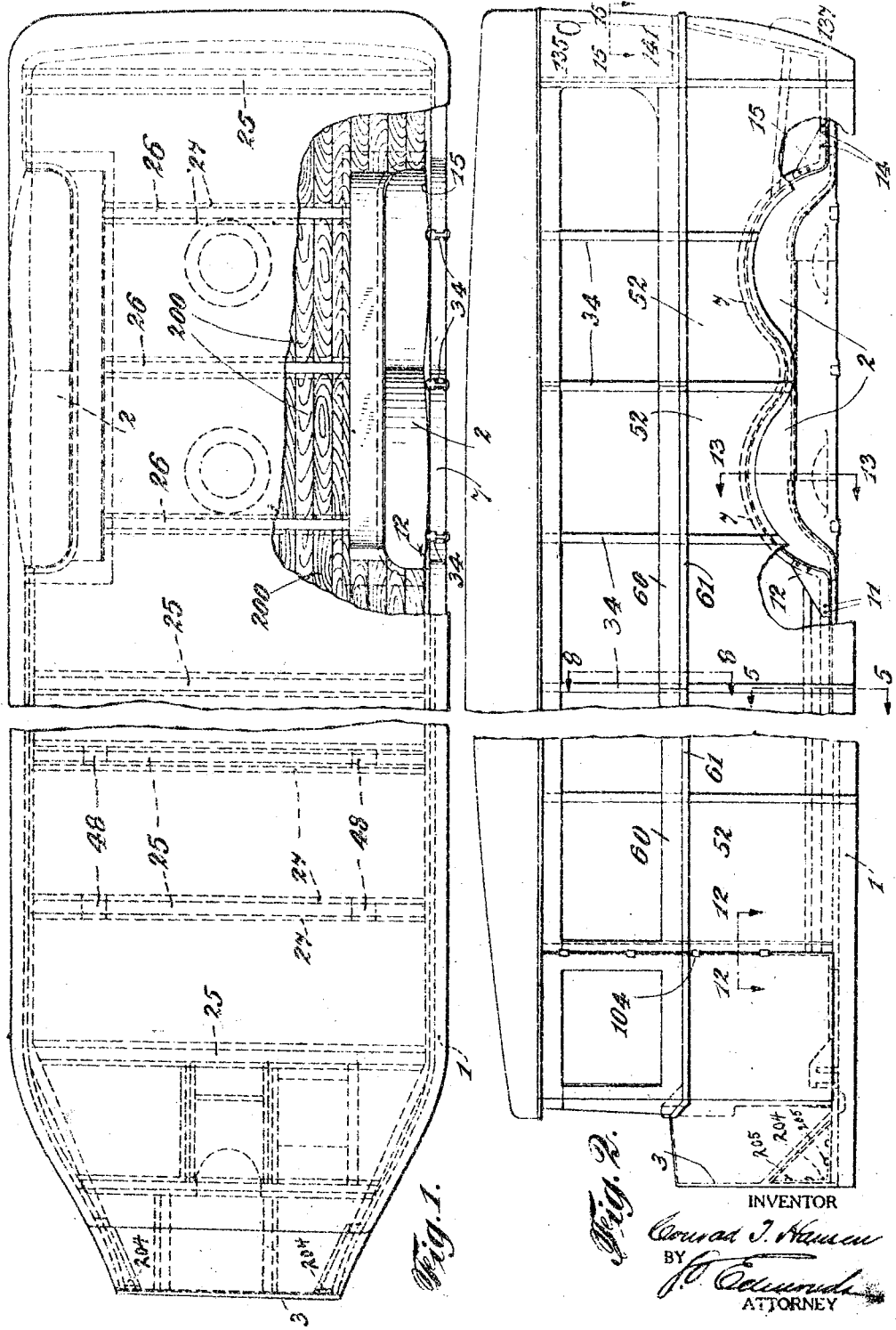

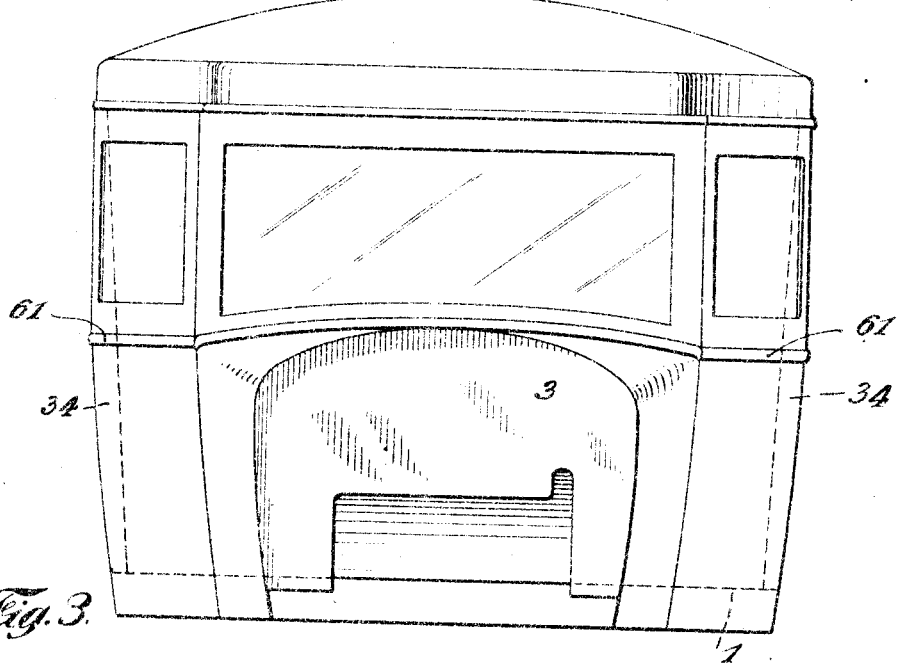
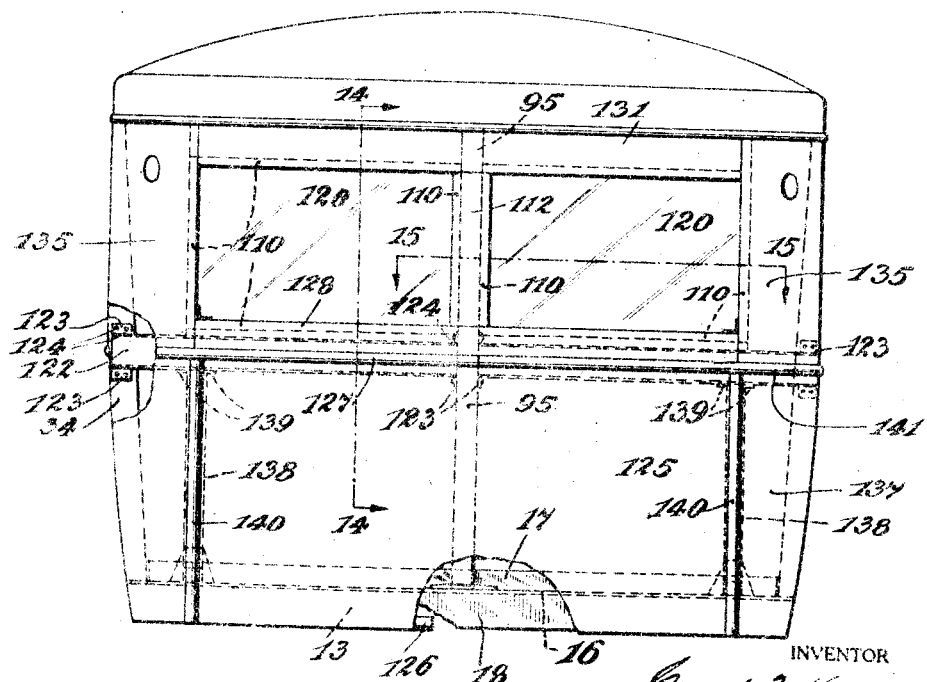

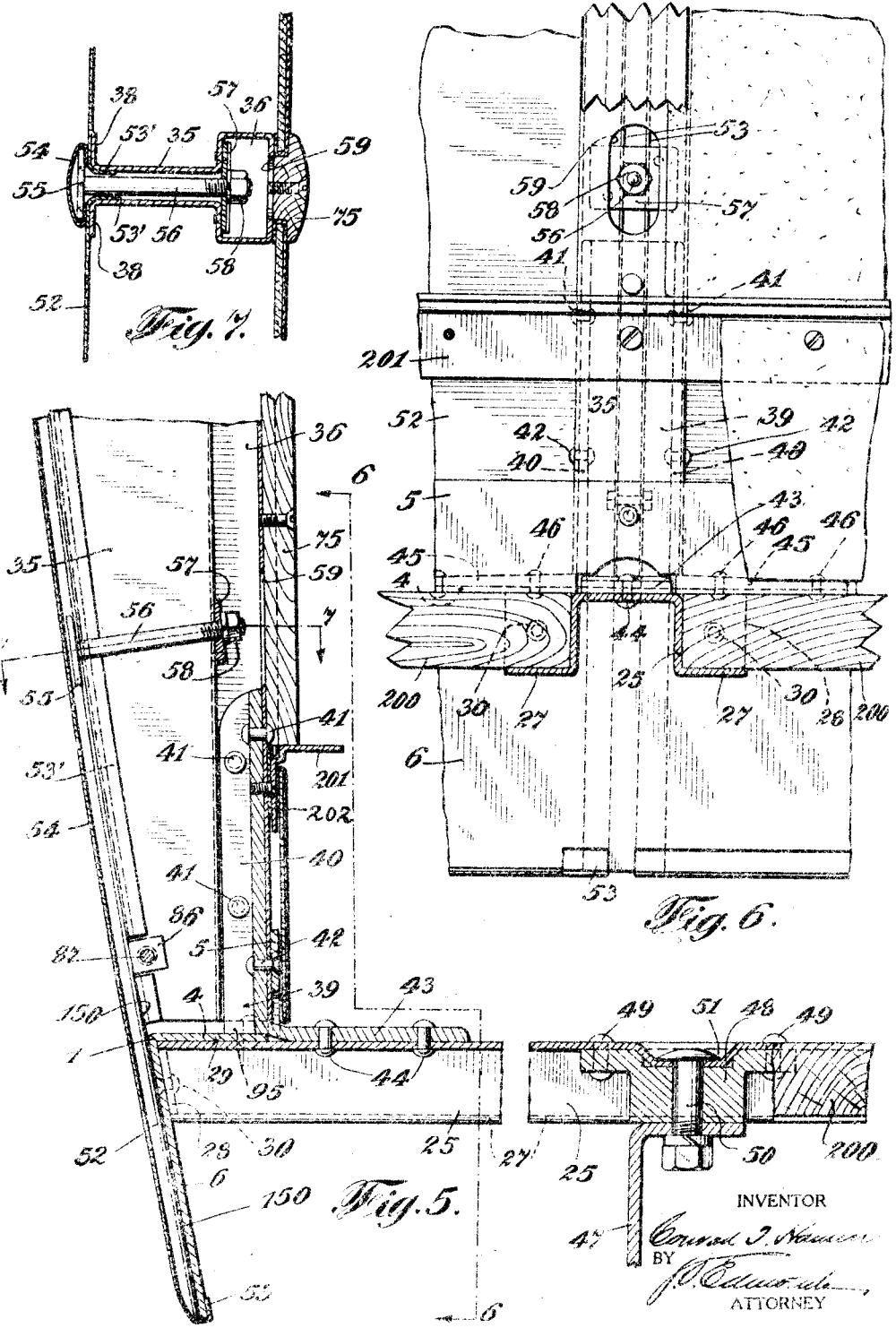

June 19, 1928.

C. T. HANSEN 1,674,394

VEHICLE BODY CONSTRUCTION

Filed Oct. 9, 1924

INVENTOR
Conrad T. Hansen
BY
ATTORNEY

June 19, 1928.  1,674,394
C. T. HANSEN
VEHICLE BODY CONSTRUCTION
Filed Oct. 9, 1924  7 Sheets-Sheet 5

INVENTOR
Conrad T. Hansen
BY
ATTORNEY

June 19, 1928.
C. T. HANSEN
1,674,394
VEHICLE BODY CONSTRUCTION
Filed Oct. 9, 1924    7 Sheets-Sheet 6
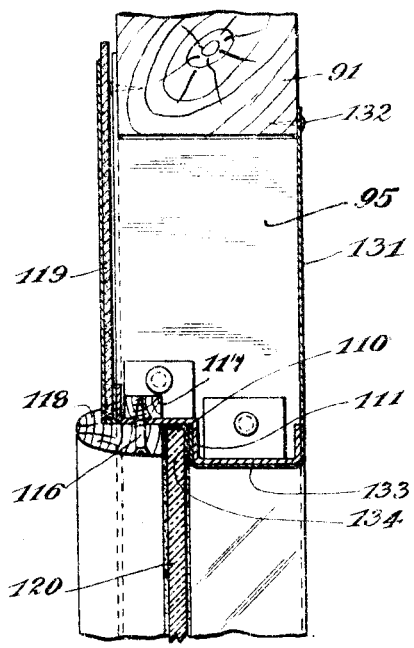
Fig. 14.
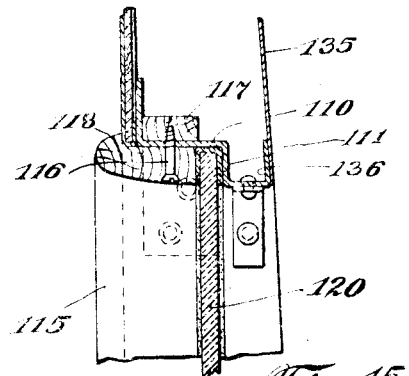
Fig. 15.
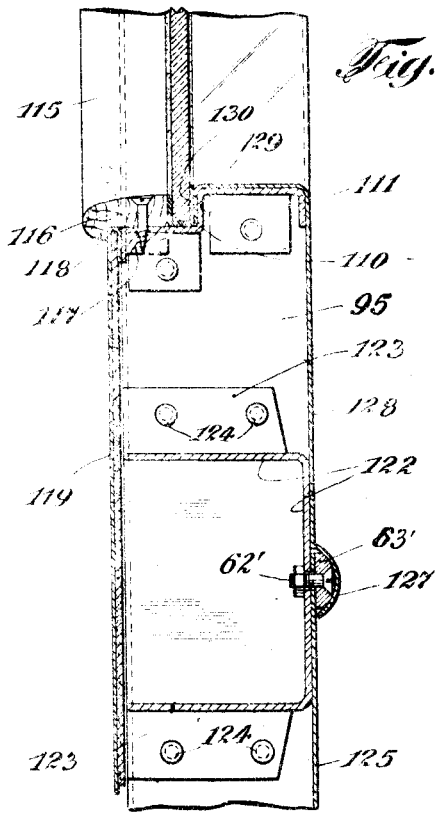
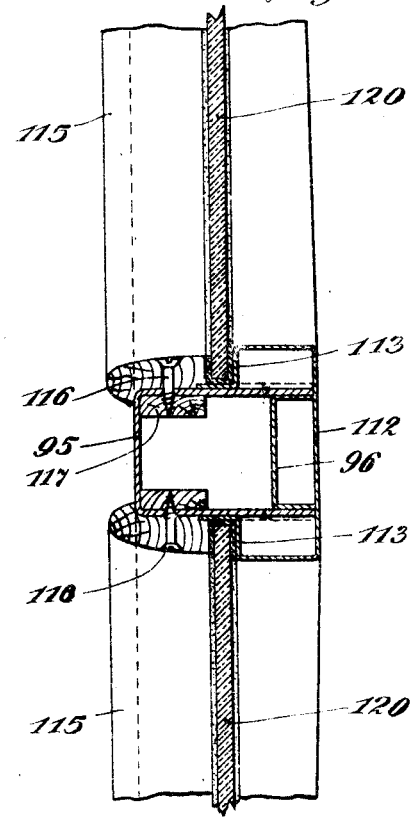
INVENTOR
Conrad T. Hansen
BY
ATTORNEY June 19, 1928.  
C. T. HANSEN  
1,674,394
VEHICLE BODY CONSTRUCTION
Filed Oct. 9, 1924 7 Sheets-Sheet 7
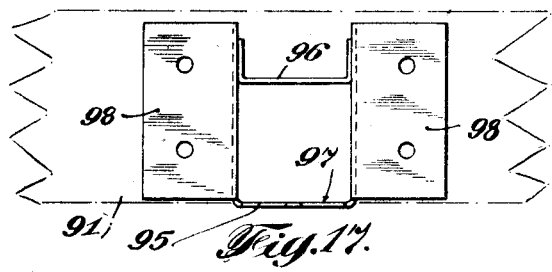
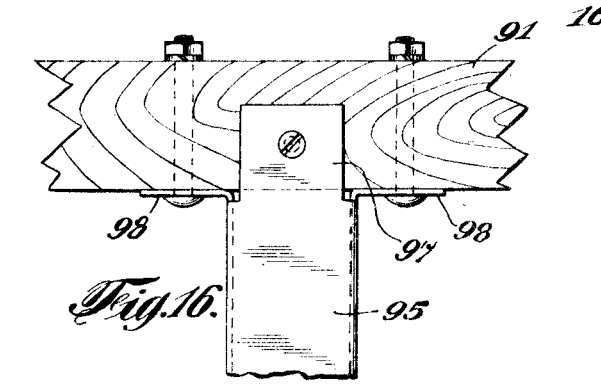
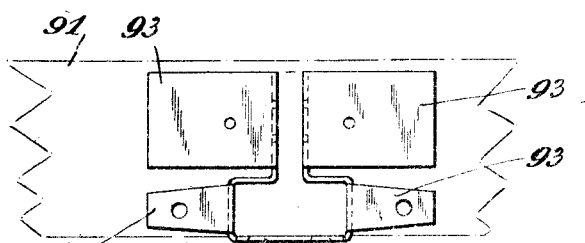
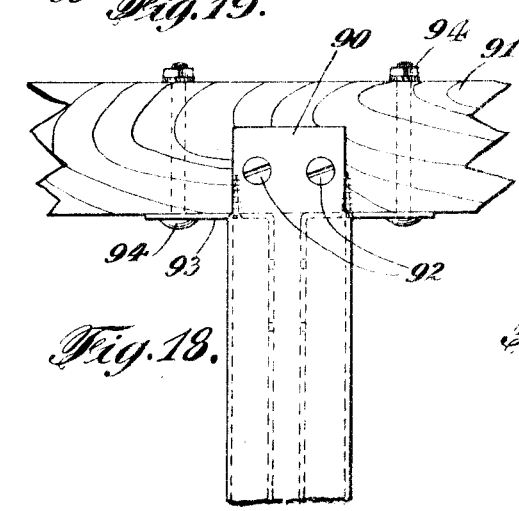
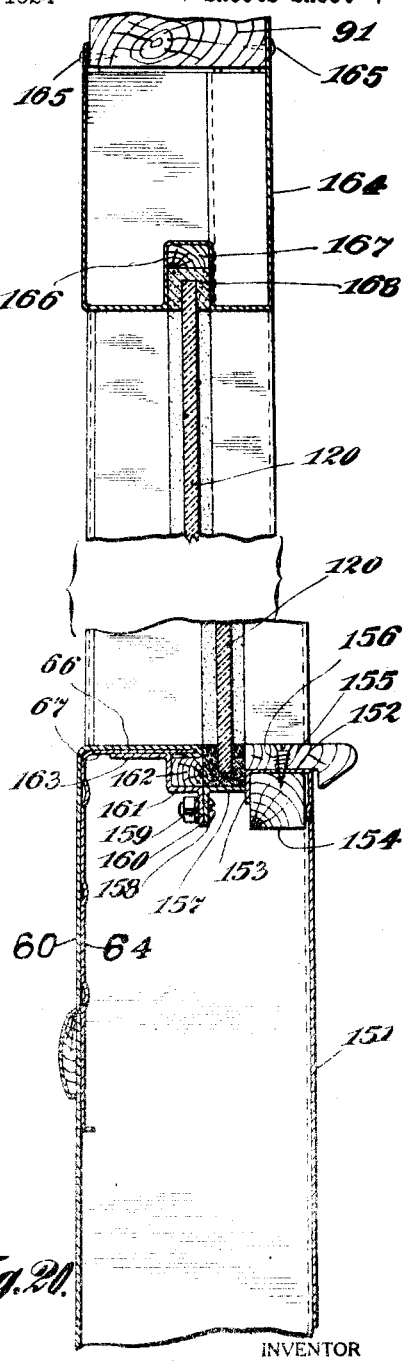
INVENTOR  
Conrad T. Hansen  
BY  
ATTORNEY Patented June 19, 1928.

1,674,394

UNITED STATES PATENT OFFICE.

CONRAD T. HANSEN, OF DETROIT, MICHIGAN, ASSIGNOR TO THE AMERICAN MOTOR BODY CORPORATION, OF PHILADELPHIA, PENNSYLVANIA, A CORPORATION OF DELAWARE.

VEHICLE BODY CONSTRUCTION.

Application filed October 9, 1924. Serial No. 742,500.

This invention relates to vehicle bodies, and more particularly relates to a closed body for automobile passenger buses adapted to be mounted on the chassis of an automobile.

One of the objects of my invention is to provide a vehicle body in which comparatively small sections of paneling may be readily and easily replaced individually, so that when it is desired to repair a portion of the paneling, due to injury thereof, or for any other reason, this may be accomplished readily and easily without requiring substantially the entire paneling to be removed, as has heretofore been necessary; and to provide improved means for securing such separate and individual panel plates to the body in such a way that each plate may readily, easily, and very quickly be removed from or attached to the body by persons who are not required to be skilled workmen.

Another object of my invention is to provide a vehicle body having windows equipped with improved means for retaining the window panes in place in such a way that each pane may readily, easily, and very quickly be replaced by unskilled persons.

Another object of my invention is to provide an improved design of metallic body post, which is not only extremely strong and durable, and very light in weight, but also serves as a portion of the panel retaining means and the window glass retaining means above referred to, thereby eliminating additional parts which would increase the weight of the body and complicate the construction.

Another object of my invention is to provide body posts having their top ends so designed that a roof rail may be readily, easily and quickly secured thereto so as to be firmly and rigidly supported thereby, and permitting the roof rail to be quickly detached from the post, all without requiring skilled labor.

Another object of my invention is to provide an improved sill construction for vehicle bodies, whereby increased strength and resistance to vibration and shock is obtained, and at the same time the construction is lightened, and affording sturdy support for the body posts and paneling.

Another object of my invention is to provide an improved vehicle body platform construction which serves to distribute evenly throughout the entire body vibrations and strains from the chassis of the vehicle, and which also serves to take up and distribute evenly to the chassis all load strains applied to the body, thus preventing the localization of all vibrations and strains and causing the body and chassis to act as units in resisting vibrations and strains due to travel and road; and to provide a platform which has elasticity, so as to be less likely to break under sudden shocks or strains and to better withstand continued hard usage.

Another object of my invention is to provide improved means for securing upholstery pads on the inside of the vehicle for quick and easy detachment and replacement, and without requiring the use of tacks or nails.

A further object of my invention is to provide an improved hinge pillar construction which permits of a panel plate edge to be quickly and easily attached thereto and detached therefrom without requiring the hinge mounting to be disturbed.

A further object of my invention is to provide means for preventing metal-to-metal contact between adjacent portions of the metallic parts of the body to prevent noise and rattle when the body weaves and vibrates.

A further object of my invention is to provide a closed passenger bus body which is exceptionally well suited to withstand for a long period of time the hard usage customarily given to passenger automobile buses, the body, at the same time, being light in weight, attractive in appearance, and accommodating comfortably a reasonable number of passengers, besides the driver; and a bus body comprising relatively few parts, and capable of being manufactured comparatively quickly and inexpensively, with a minimum requirement of skilled labor.

Other objects of my invention will be in part obvious and in part pointed out hereinafter.

My invention accordingly consists in the features of construction, arrangements of parts, and combinations of elements, which will be described more fully hereinafter, and the scope of the application of which will be pointed out in the claims that follow.

In order that a clearer understanding of my invention may be had, attention is hereby directed to the accompanying drawings, forming a part of this application, and illustrating certain possible embodiments of the invention.

Referring to the drawings:

Fig. 1 is a top elevation of a bus body embodying my invention, certain portions being broken away and certain parts being shown in dotted lines, to more clearly show the construction;

Fig. 2 is a similar view showing the bus body in side elevation;

Fig. 3 is a similar view showing the bus body in front elevation;

Fig. 4 is a similar view showing the bus body in rear elevation;

Fig. 5 is a sectional view, taken on the line 5—5 of Fig. 2;

Figure 8:
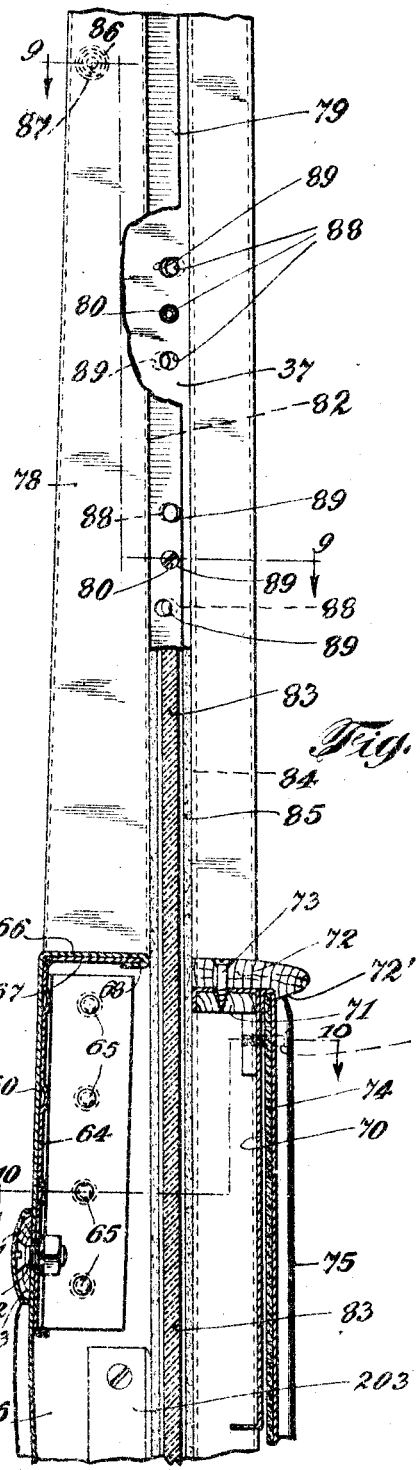
Figure 9:
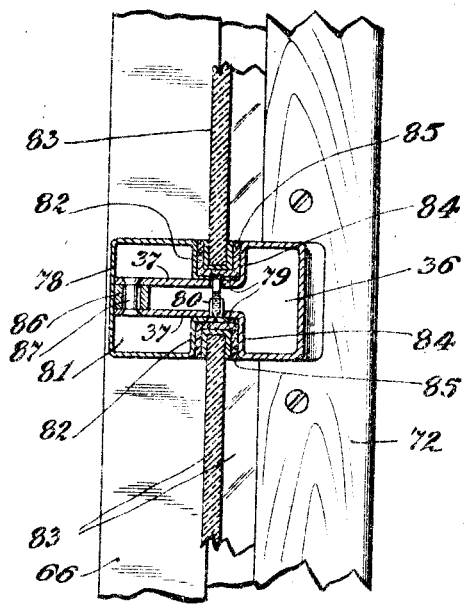
Figure 10:
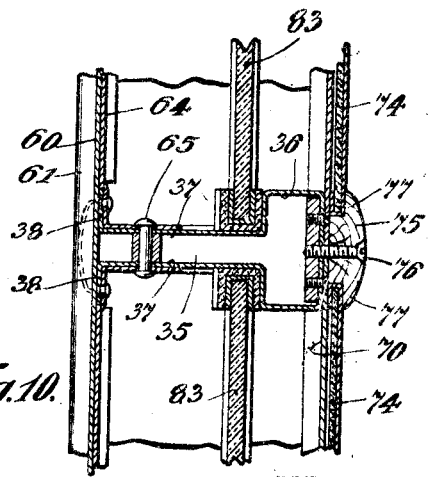
Figure 11:
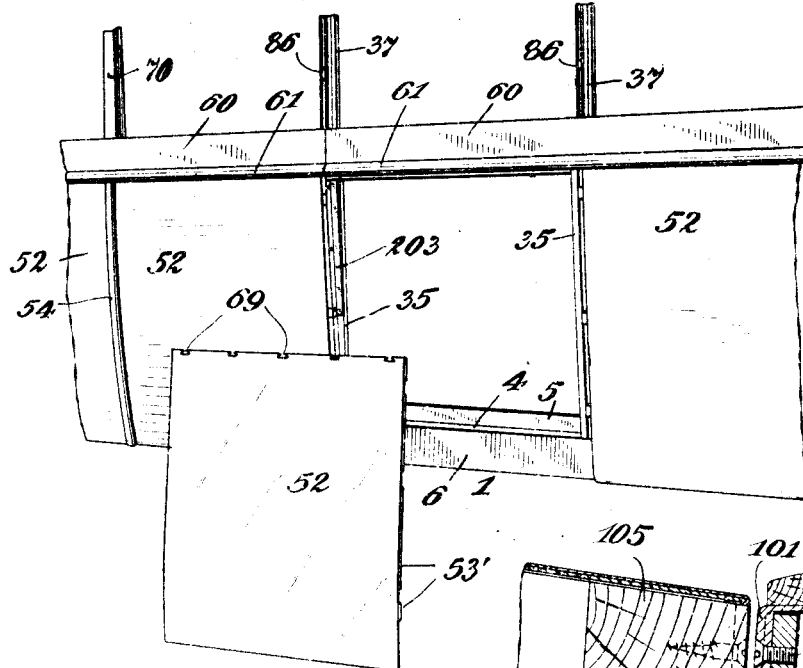
Figure 12:
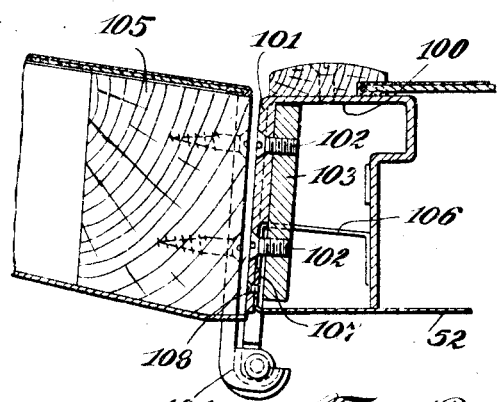
Figure 13:
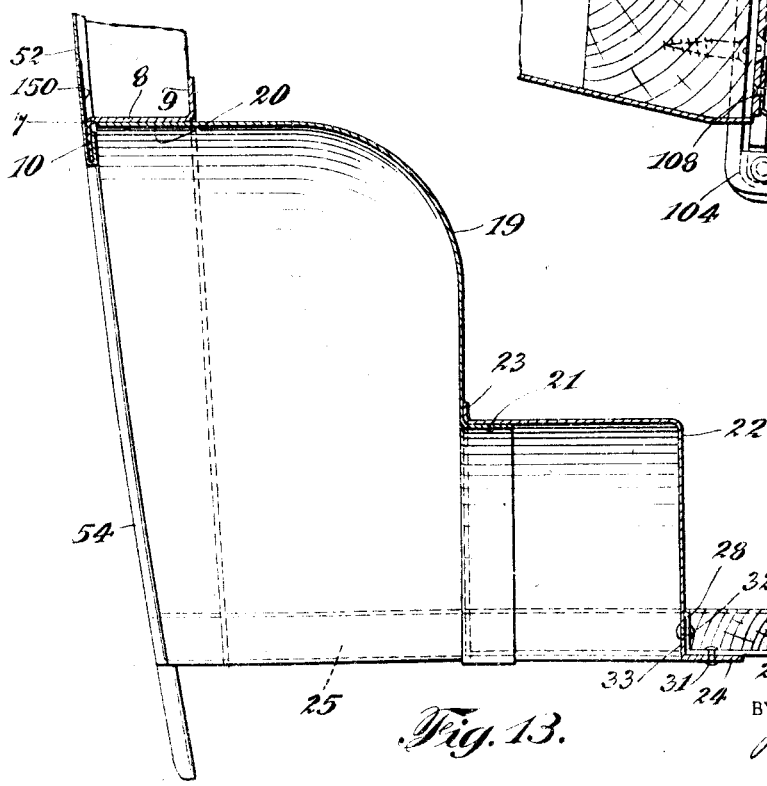

Figs. 6 and 7 are each a sectional view, and are taken respectively on the lines 6—6 and 7—7 of Fig. 5;

Fig. 8 is a sectional view, taken on the line 8—8 of Fig. 2;

Figs. 9 and 10 are each a sectional view, and are taken respectively on the lines 9—9 and 10—10 of Fig. 8;

Fig. 11 is a perspective view of a side portion of the bus body, and of a panel plate detached therefrom;

Figs. 12 and 13 are each a sectional view, and are taken respectively on the lines 12—12 and 13—13 of Fig. 2;

Fig. 14 is a sectional view, taken on the line 14—14 of Fig. 4;

Fig. 15 is a sectional view, and is taken on the lines 15—15 of Figs. 2 and 4;

Fig. 16 is a plan view, showing the manner in which the top of the rear body post is attached to a roof rail, only a fragment of the roof rail and post being shown;

Fig. 17 is a top view of the post, showing the location of the roof rail in dot and dash lines;

Fig. 18 is a plan view, showing the manner of attaching the top of a side post to the roof rail, only a fragment of the post and rail being shown;

Fig. 19 is a top view of a side body post, showing a fragment of a roof rail in dot and dash lines; and Fig. 20 is a broken vertical sectional view through the side of the body, showing a modified form of construction suitable for stationary windows.

Similar reference characters refer to similar parts throughout the several views of the drawings.

Referring to the drawings, there is a sill extending along both sides and across the rear of the body. The sill is Z-shaped in cross-section and may be made in one piece or in several pieces rigidly secured together into a substantially integral unit. As shown in the drawings, the sill unit comprises a front side portion 1 at each side of the body, extending from each rear wheel kick-up 2 to the dash member 3, and is Z-shaped in cross-section, having a horizontal portion 4, an upwardly directed flange 5 extending along the inner edge of the horizontal portion and a downwardly directed flange 6 extending along the outer edge of the horizontal portion. Curving over each kick-up portion 2 there is a sill portion 7, which is also Z-shaped in cross-section, and forms a continuation of each sill portion 1. Sill portions 7 each have a horizontal portion 8, an inner upwardly directed flange 9 and an outer downwardly directed flange 10. The adjacent ends of these sill portions overlap each other and are bolted, riveted, or welded together, as at 11, to secure a rigid connection. A gusset plate 12 may also be riveted or welded to sill portions 1 and 7 to reenforce and strengthen the connection. The rear sill portion 13 of the sill construction extends across the rear of the body and curves forwardly at the sides to meet the sill portions 7, the ends of which it overlaps and to which it may be rigidly secured, as by welding, bolting, or riveting, as at 14, and a gusset plate 15 may also be secured to these parts to strengthen and reenforce the connection. Sill portion 13 is likewise Z-shaped in cross-section and forms a continuation of the sill portions 7. Portion 13 has a horizontal flange 16, an inner, upwardly directed flange 17, and an outer downwardly directed flange 18.

At each kick-up portion there is a suitably curved and contoured sheet metal member 19, secured along its outer edge 20 to the under-side of portion 8 of member 7, and having an inwardly directed horizontal flange 21 along its inner edge. Another suitably contoured sheet metal member 22 rests along its outer edge on this flange 21, and is secured thereto, as by welding, preferably having itself a vertical flange 23 which lies against and is welded to the member 19. Along the inner (and lower) edge of member 22 is a horizontal flange 24.

There are a plurality of cross-pieces 25, which extend between and are secured to the sill members 1, and other cross-pieces 26 extend between and are secured to the kick-up members 22. All these cross-pieces are channel-shaped in cross-section, with the channel opening downwardly, and having horizontal flanges 27 along the edges of each side wall of the channel directed outwardly therefrom. Each end of each cross-piece also has laterally extending vertical flanges or ears 28. Each end of cross-pieces 25 has the bottom of the channel disposed against the under-side of sill portion 4 and is welded or riveted thereto, as at 29, and has the ears 28 disposed against the sill flange 6, and welded or riveted thereto, as at 30. Each cross-piece 26 has its flanges 27 resting on and secured to flange 24, as at 31, and has its ears 28 disposed against and secured, as at 32, to a vertical portion 33 of member 22.

The side body posts 34 rest on the sill portions at the places where the cross-pieces 25 are secured thereto. These posts are channel-shaped in cross-section, with the channel 35 open toward the outside of the body, and having along the bottom of the channel a rectangular enlarged portion 36. The outer ends of the side walls 37 of the channel are flanged laterally at their ends as at 38, below the window openings in the body. These posts rest upon the sill portions and are secured in place by means of brackets 39. Each bracket has an upwardly extending channel portion 40, which seats within the lower portion of the post, and is secured to the back and side walls of the post by welding or riveting, as at 41. The upwardly directed flanges 5 or 9 of the sill portions 1 or 7 abut the rear of the posts, and are preferably secured to the posts by rivets 42, which also engage the vertical portion 40 of the brackets 39. Each bracket 39 has an arm 43, which rests upon a cross-piece, such as 25, and is secured thereto by welding or by rivets 44. Each bracket 39 also has horizontal arms 45, which extend in opposite directions and rest upon the horizontal portions 4 or 8 of the sill portions 1 and 7, to which these arms 45 are secured by welding or riveting, as at 46. At the door openings the brackets 39 are minus the arm which would extend into the doorway. At the sill portion 8 these brackets are minus the inwardly directed arms 45, and if such a bracket is used for the rear post, this is also minus the arm 43.

The cross-pieces 25 and 26 are adapted to rest upon the usual pair of spaced longitudinal frame members 47 of an automobile chassis. A filler piece 48 may be inserted in the channel of the cross-pieces where they rest on the chassis frame, and this filler piece may be riveted, as at 49, to each cross-piece. The attachment to the chassis frame members may be made by means of bolts 50, which extend through the cross-pieces and the filler pieces and engage the chassis frame members. If desired, suitable depressions, such as 51, may be provided in the cross-pieces for the bolt heads. The ends of the cross-pieces are arranged to overhang the chassis frame members, and in this way shock absorbing construction is obtained. The body platform constructed and mounted in this manner functions to distribute evenly throughout the entire body vibrations and strains from the chassis, and also functions to take up and to distribute evenly to the chassis all load strains applied to the body. The assembly is such that localization of vibrations and strains is prevented, and the body and the chassis act as integral units in resisting vibrations and strains due to travel and load.

The lower paneling of the body at the sides includes a plurality of separate panel plates 52 of substantially rectangular form. The bottom edge of each panel plate is provided with an interior upwardly open channel 53, which is disposable about the lower edge of the sill portions 6 and 10. Each side edge of the panel plates has an inwardly extending flange 53', which seats in the channel 35 of the adjacent body post, so that the flanges 38 of the post will rest along the inside of the panel edge. The side edges of each panel plate are detachably secured to the adjacent post by means of retaining members, comprising strips of metal 54, preferably in the form of a molding. Each strip 54 encloses the heads 55 of a plurality of bolts 56, which are disposable into the channel 35 of a post and have threaded ends ending within the enlarged portion 36 thereof. By placing a washer 57 on the bolt in post portion 36 and by threading a nut 58 on the bolt, a retaining strip 54 may be removably secured to the post, so that it will overlap the edges of the two adjacent panel plates 52 and bind them against the post. The inner wall of each post is cut away, as at 59, at suitable places to permit ready and easy access to the nuts 58, for the attachment and detachment of the retaining strips and panel plates. The upper edge of each panel plate is adapted to be removably seated behind a panel portion 60, the lower end of which has a molding portion 61. This portion is secured to the body by means of bolts 62, which are held in a strip 63 secured within the molding 61 in any suitable manner. The bolts 62 engage a plate 64, which extends between and is secured to two body posts, as at 65. Preferably members 60 and 64 have superimposed horizontal flanges 66 and 67 along their top edges, and the end of upper flange 66 may be doubled over the end of flange 67, as at 68. The upper panel plate edge is preferably provided with dovetail recesses 69, which receive the shanks of the bolts 62 to permit substantial overlapping of the upper edge of the panel plate by the molding portion 61.

From the inside of one post to the inside of the next post at substantially the height of the molding portion 61 is secured a metallic plate 70, which is channel-shaped along its top edge. A wooden strip 71 may be seated in this channel. The side ends of plate 70 may be secured to the posts by machine screws or other means. An inside window rail 72 is preferably disposed on the top of each plate 70 and is removably secured in place by means of screws 73, which engage the wooden strips 71. Members 72 are formed with an outwardly directed shoulder portion 72', which is adapted to overlap the top edge of an upholstery pad 74. Each upholstery pad extends between two adjacent posts and is secured in place along its side edges by vertical retaining strips 75, which are adapted to be secured to each post by machine screws 76. Each member 75 is provided with two oppositely extending shoulder portions 77, which overlap the side edges of the adjacent upholstery pads 74. Thus, it will be apparent that the upholstery pads are readily removable merely by removing one or both of its side retaining strips 75. The lower edges of the pads 74 rest between the seat rail 201 and clips 202 secured to its rear, which form therewith a retaining channel therefor.

Above this portion of the construction each post is adapted to have telescoped over its channel walls 37 a complementary window glass retaining member 78, which is channel-shaped in cross-section, with the channel opening toward the inside of the body. The ends 79 of this member are adapted to come against the post channel walls 37 and to be secured thereto by cap bolts 80, permitting these parts to be readily and easily attached together and separated. Member 78 has an enlarged rectangular portion 81 toward the outside of the body, which presents shoulder portions 82, constituting abutments for the outside of window panes 83 at each side of the post. The enlarged portion 36 of the post presents abutment shoulders 84 for the inside of the window panes 83. Preferably a channel-shaped felt runway strip 85 is provided for the window glass in each window channel established by the shoulders 82 and 84. For reenforcement, filler pieces 86 may be provided between the channel walls 37, and these filler pieces may be secured in place by means of rivets 87.

An important feature of this invention is the fact that the above window placement construction permits the replacement of window glass from the outside of the body. To replace a window, it is lowered into its well; felt runways 85 for its side edges are removed; the screws 80 are loosened, and the retaining strips at each side of the window are removed from the posts. The window pane may now be raised, and is free to be removed from the body in an outward direction. A new pane is now easily replaced in the well. The retaining members 78 are replaced on each adjacent post and are secured thereto by means of the bolts 80. Thereafter it is only necessary to replace the felt runways 85, and the replacement is complete.

Another important object of my invention is to provide means for adjusting each retaining strip 78 relatively to its post to permit widening or narrowing of the glass channel to accommodate different thicknesses of glass. This is accomplished in the following manner. I provide in the walls 37 of each post a series of holes 88, which are in a substantially vertical line, and I provide in the walls 79 of each retaining strip 78 a series of holes 89, which are in horizontal alignment respectively with the holes 88 in the posts, but which are out of vertical alignment therewith, being staggered in respect thereto. These holes are adapted to receive the screws 80, and by aligning different sets of holes in the retaining members and the posts, these members may be secured together in different relative positions, which give wider or narrower glass channels.

At the upper end of each side post the back wall is preferably extended vertically to provide a flange 90, which is adapted to rest against the inside surface of a roof rail 91, to which it may be secured by screws 92. The side walls of the posts are preferably flanged horizontally at the top, as at 93, and these flanges 93 are arranged to rest against the lower surface of the roof rail, so that they may be secured thereto by bolts 94, which extend through the flanges and the rail.

At the rear of the body the post 95 may be of channel-shape, with a channel-shaped strip 96 secured within the post to reenforce the same. This post at its top may also have a vertical flange 97 adapted to rest against and be secured to the inside surface of a roof rail, and may have horizontal flanges 98, which rest against the under-side of the roof rail and may be bolted thereto.

At the doorway the hinge post 100 may be channel-shaped in cross-section, with the channel opening toward the outside of the body, and may have a straight wall 101 at the doorway, to the inside of which may be secured, as by screws 102, a strip 103, to which the hinges 104 of the door 105 may be attached. A reenforcing channel strip 106 may be secured between the side walls of the post. The side edge flange 107 of the panel plate 52 at this hinge post may be removably disposed between the post wall 101 and the strip 103, and this flange 107 may be removably secured to the wall 101 by means of screws 108. This flange 107 is preferably cut away at the hinges 104, so that this panel plate may be attached to and removed from the hinge post 100 by merely adjusting the screws 108 and without requiring the door or the hinges to be disturbed.

At the rear of the body I preferably provide stationary windows. At the top, bottom and the edge toward the side of the body of each window I attach a metallic strip 110, which forms an abutment shoulder 111 for the outside of the window at these edges. Over the post 95, which is intermediate these windows, I place a metallic member 112, which at each side of the post has abutment shoulders 113 for the outside of the windows at the edges adjacent the post. Member 112 may be secured to the post 95 by spotwelding. On the inside of the body at the window edges I secure window retaining strips 115, which may be secured in place by means of screws 116, which extend through the members 110 or the walls of the post 95, and engage suitably located wooden strips 117. Members 115 are preferably provided with shoulders 118, which are adapted to overlap upholstery pads 119, and whereby these pads are detachably secured to the body. The rear windows are designated 120, and, as will be readily apparent, are firmly retained in the channels formed by the cooperation of members 115 with the members 110 and the member 112.

To reenforce the rear portion of the body, a horizontal channel member 122 is preferably extended thereacross, and is secured at each end to the rear side posts of the body by means of vertical flanges 123 formed on the member 122 and welded or bolted to these posts, as at 124.

Suitable paneling may be secured across the rear of the body in any suitable manner. For instance, a lower panel portion 125 may be provided, which has an upwardly directed channel 126 along its lower edge, which hooks about the lower edge of the sill portion 18. The construction at this point is the same as is carried out on the sides, that is, the lower panels 125 and 137 are notched and flat along the top edge and are placed underneath the lower part of the upper panels 128 and 135, each of which has a molding, 127 and 141, stamped in same to which is welded a solid molding 63' and bolts 62' for assembling to the channel member 122. The upper edge of panel 128 may be bent inwardly, as at 129, and then downwardly, as at 130, hooking over the shoulder 111 of the member 110. Across the upper portion of the windows there may be extended a panel portion 131, which may be secured along its upper edge to the roof rail 91, as by means of nails 132, and which along its lower edge may be bent inwardly, as at 133, and then upwardly, as at 134, hooking over the shoulder portion 111 of the upper member 110. At the rear corners of the body suitably curved panel members 135 may be provided. The lower portion 137 of this rear corner panel may be secured at the rear of the body to a post 138, which extends from the sill portion 16 to the lower side of a cross member 122, where the post 138 may have horizontal flanges 139, which are welded or bolted to the member 122. Vertical molding strips 140 may be applied on the outside of the body at each of these posts 138. The molding strips may be continued from the sides of the body around the rear corners thereof, as at 141, where they may be secured in place by means of suitable bolts attached to the molding portion 141 and which engage the cross member 122.

In order to prevent noise and rattle, metallic portions of the construction are prevented from coming into metal-to-metal contact with adjacent metallic parts by means of fibrous or other non-metallic material interposed between the two adjacent metallic parts. This may be employed wherever convenient and desirable. For instance, between the lower edges of the panel plates 52, where they abut the downwardly directed sill flange 6 or 10, as shown in Figs. 5 and 13, thin felt 150 is shown between these parts, and is preferably pasted to the inner surface of the panel plate. It is not deemed necessary or desirable to illustrate the application of the felt at other places in the construction, as it might detract from the clearness of the other structural features as shown in the drawings.

If it is desired to have stationary windows in the sides of the bus instead of movable windows, the construction may be modified as shown in the lower part of Fig. 20. As shown in that view of the drawings, an interior panel plate 151 extends between the two adjacent posts, to which it may be secured by the interior retaining strips 75 or by means of machine screws. The upper edge of this panel has a horizontal flange 152 and a downwardly extending flange 153 and encloses a wooden strip 154. The window rail 155 may be secured to strip 154 by means of screws 156, and together with the shoulder formed by flange 153 forms an interior abutment for the window glass 120. The bottom edge of the window is supported on a horizontal flange 157 of an angle strip 158, to the other flange of which is bolted, as at 159, the flange of another strip 160, which has a rabbet 161, in which is seated a wooden strip 162, which constitutes an abutment against the outside of the window glass. Strip 160 has a horizontal flange 163, which rests underneath and is secured to the superimposed horizontal flanges 66 and 67 of the members 60 and 64. At the top of the window the construction may be similar to the construction where movable windows are employed. For instance, over the top of each window there is a panel portion 164 extending between two adjacent posts. Member 164 is of channel-shape in cross-section, with the ends of the side walls of the channel overlapping the inside and outside surfaces of the roof rail 91, where these portions of the member 164 may be secured by means of nails 165. A downwardly opening channel portion 166 is formed along the bottom wall of the member 164. This channel 166 is adapted to receive the top edge of the window pane 83 or 120. Preferably a wooden strip 167 and a channel felt 168 are located in the channel 166. As before stated, this window header construction is the same for both stationary windows and movable windows.

Floor boards 200 may suitably be supported on the lateral flanges 27 of the cross-pieces. If desired or found necessary, a seat rail 201 may be secured to each of the side posts on the inside of the body. Also suitable vertical guide strips 203 may be secured to the posts to guide the window glass 83 when moving in its well.

The conventional structures are usually weak where the dash 3 is mounted on the ends of the sill portions 1. To overcome this weakness, I secure an angle iron 204 to the dash 3 at each side edge and to the adjacent horizontal sill flange 4, as by means of bolts 205.

It is believed that all features of the construction for which I desire patent protection will be clearly understood from the foregoing description, and that the method of assembling the parts and making replacements of replaceable parts has been so brought out and so described and illustrated as to be readily and clearly understood.

As many changes could be made in the above construction, and as many apparently widely different embodiments of this invention could be made without departing from the scope thereof, it is intended that all matter contained in the above description or shown in the accompanying drawings shall be interpretated as illustrative and not in a limiting sense.

What I claim is:—

1. In vehicle body construction, in combination, a sheet metal post having a channel open outwardly of the body and a lateral flange, spaced transverse reenforcements in said channel, a sheet metal body panel applied against the outside of said lateral flange and having an edge flange seated in said post channel, said panel edge flange having cut away portions to accommodate said reenforcements, and means for removably confining said panel flange in said channel.

2. In vehicle body construction of the character described, in combination, a body post having an outwardly open recess and a lateral flange, a body panel applied against the outside of said lateral flange and having an edge flange seated in said post recess, and means for detachably securing said panel flange in said post recess, said means including a retaining member overlapping said panel along said lateral post flange, and a securing member connected to said retaining member and removably secured to said post.

3. In vehicle body construction of the character described, in combination, a body post having an outwardly open recess and a lateral flange, a body panel applied against the outside of said lateral flange and having an edge flange seated in said post recess, and means for detachably securing said panel to said post, said means including a strip overlapping said panel along said lateral flange of the post, and bolts secured to said strip and removably secured to said post.

4. In vehicle body construction of the character described, in combination, a body post of channel shape in cross-section, with the channel open toward the outside of the body, and formed with an enlarged portion along the bottom of the channel of rectangular, box-like shape in cross-section, a panel plate having a side edge at the outer side of said post, and a member removably secured in the channel of said post and removably overlapping said panel plate, for detachably binding said panel plate to said post, said panel having an edge flange seated in the channel of said post.

5. In vehicle body construction of the character described, in combination, a body post of channel shape in cross-section, with the channel open toward the outside of the body and formed with an enlarged portion along the bottom of the channel of rectangular, box-like shape in cross-section, a panel plate having a side edge at the outer side of said post, and a member removably secured in the channel of said post and removably overlapping said panel plate, for detachably binding said panel plate to said post, said panel having an edge flange seated in the channel of said post, and an edge of a side wall of said channel being flanged laterally and seated behind said panel plate.

6. In vehicle body construction of the character described, in combination, a body post of channel shape in cross-section, with the channel open toward the outside of the body, and formed with an enlarged portion along the bottom of the channel of rectangular, box-like shape in cross-section, a panel plate having a side edge flange seated in said post channel, a retaining strip removably overlapping said panel plate and said post, bolts secured to said strip and removably seated in said channel and ending in said box-like portion, and adjustable means engaging said bolts and said post within said box-like portion thereof, for detachably securing said strip and panel plate to said post.

7. In vehicle body construction of the character described, in combination, a body post of channel shape in cross-section, with the channel open toward the outside of the body, and formed with an enlarged portion along the bottom of the channel of rectangular, box-like shape in cross-section, a panel plate having a side edge flange seated in said post channel, a retaining strip removably overlapping said panel plate and said post, bolts secured to said strip and removably seated in said channel and ending in said box-like portion, and adjustable means engaging said bolts and said post within said box-like portion thereof, for detachably securing said strip and panel plate to said post, the post having apertures in the bottom of said channel providing access to said adjustable means for adjustment thereof to effect the attachment or detachment of said panel plate to or from the body.

8. In vehicle body construction, a metallic sill of Z-shape in cross section, having a central horizontal portion, an upwardly extending flange along the inner edge of the horizontal portion and a downwardly extending flange along the outer edge of said horizontal portion, a cross member applied against and secured to the under surface of the horizontal sill portion, a post resting on the horizontal portion of the sill, and a reinforcing bracket member having a horizontal portion extending through the inner sill flange and abutting and secured to the horizontal sill flange and the cross member from above, and having an upwardly extending portion abutting and secured to the post.

9. In vehicle body construction of the character described, in combination, metallic side sills of Z-shape in cross-section, each having a central horizontal portion, an upwardly extending flange along the inner edge of the horizontal portion and a downwardly extending flange along the outer edge of said horizontal portion, sheet metal cross pieces extending across the body and secured to the sills at each side of the body, pillar reenforcements penetrating the inner edge flange of the sill, each overlying and secured to a horizontal sill flange and a cross piece, and chassis frame members supporting said cross pieces intermediate their ends.

10. In vehicle body construction of the character described, in combination, metallic side sills of Z-shape in cross-section, each having a central horizontal portion, an upwardly extending flange along the inner edge of the horizontal portion and a downwardly extending flange along the outer edge of said horizontal portion, sheet metal cross pieces extending across the body and secured to the sills at each side of the body, and forming therewith an integral body platform which absorbs, resists and distributes as a unit strains and vibrations applied locally to any part thereof, chassis frame members supporting said cross pieces intermediate their ends, said cross pieces having lateral flanges at their ends abutting and secured to the downwardly directed flanges of said sills, body posts supported on and secured to said sills, post reenforcing brackets extending through the inner edge flange of a sill and overlying and secured to a horizontal sill flange and a cross piece, and having an upright portion abutting and secured to a post, and panel plates secured to said posts and covering the outside of the downwardly extending sill flanges.

11. In vehicle body construction of the character described, in combination, a door, a door post of channel shape in cross-section with the channel open toward the outside of the body, a panel plate having an inwardly directed side edge flange seated against and detachably secured to the interior side of post wall adjacent the door, and a hinge strip secured to the interior side of said channel wall, said panel plate flange being removably seated between a portion of said strip and said channel wall.

12. In vehicle body construction of the character described, in combination, a door, a door post of channel shape in cross-section with the channel open toward the outside of the body, a panel plate having an inwardly directed side edge flange seated against and detachably secured to the interior side of post wall adjacent the door, a hinge strip secured to the interior side of said channel wall, said panel plate flange being removably seated between a portion of said strip and said channel wall, door hinges secured to said hinge strip, and said panel plate having cut away portions at said hinges permitting said panel plate to be attached to and removed from said body post without detaching said hinges or hinge plate therefrom.

13. In a vehicle body construction, in combination, body posts channel shape in cross-section, the side walls of said body posts being spaced some distance apart and opening toward the outside of the body, body panels having inturned side flanges extending within the open side of said body, the side walls of said body posts being so spaced as to permit considerable lateral adjustment of said body panels to provide for variations in width thereof, vertical strips covering the space between and overlapping adjacent body panels, and means interior of the posts securing the strips and body panels thereto.

14. In a vehicle body construction, in combination, body posts channel shape in cross section with the channel open toward the outside of the body, a sill member supporting said body posts and having a downwardly extending exterior flange, replaceable body panels having inturned side flanges extending within the open side of said body posts, the side walls of said body posts being so spaced as to permit considerable lateral adjustment of said body panels to provide for variations in width thereof, means extending within said body posts securing said body panels thereto, said body panels having along their lower edges an interior upwardly opening channel removably enveloping the lower edge of said sill flange, and a horizontal molding strip secured to the outer side of the body posts, said panels having their upper edges removably seated behind said molding strips so as to permit vertical adjustment and provide for variations in length of said body panels.

15. In vehicle body construction, in combination, a channel post open toward the outside of the body and having lateral flanges projecting therefrom, replaceable body panels applied against the outside of said lateral flanges, the side walls of said channel post being so spaced as to permit considerable lateral adjustment of said body panels and to accommodate panels of varying widths, vertical strips overlapping the edges of adjacent body panels, and adjustable means within the post for removably securing the strips and panels in position.

16. In a vehicle body construction, in combination, channel posts open toward the outside of the body, replaceable body panels applied against the outside of said lateral flanges and having edge flanges seated in the channels of the posts, the side walls of said channel posts being so spaced as to permit considerable lateral adjustment of said body panels to accommodate panels of different widths, a horizontal molding strip behind which the upper edges of said panels are removably seated, and means securing said strip to the lateral flanges of the posts, said panels having spaced notches along their upper edges to accommodate said securing means, thus permitting vertical adjustment of said panels and the use of replacing panels of different lengths.

17. In vehicle body construction, a body post having an outwardly open recess and lateral flanges, a body panel applied against the outside of one of said flanges and having an edge flange seated in said post recess, a strip overlapping a side edge of said panel and covering said recess, and concealed means, adjustable within the post, holding said strip in position and removably confining said panel flange in said recess.

18. In a vehicle body construction of the character described, in combination, a body post of channel shape in cross-section with the channel open toward the outside of the body, a panel plate having a side edge flange seated in said post channel, a moulding removably overlapping said panel plate and said post, means concealed within said channel post for detachably securing said moulding and panel in position, spaced apertures on the bottom of said channel post to permit ready access to said securing means to effect the attachment or detachment of said panel plate to or from the body, a retaining strip, and means retaining said strip against the post covering said apertures for easy removal to yield access to said securing means for adjustment thereof, said retaining strip and post coacting to secure trim pads against the inside of the post.

19. In a vehicle body construction, body posts, a pair of sill members, one along each side of the body, each sill member having a horizontal portion and an upwardly projecting flange portion, cross pieces extending between and secured at their ends to the under surface of the horizontal sill portions, and bracket members having inwardly projecting arms secured to the top of said cross pieces, laterally projecting arms secured to the horizontal portions of said sills and upwardly extending channel portions inserted within and secured to the body posts.

20. In a vehicle body construction, a metallic sill having a central horizontal portion, an upwardly extending flange along the inner edge of the horizontal portion, a cross piece secured to the underside of the horizontal portion of the sill, and a bracket reenforcing member having an inwardly extending arm projecting thru an opening in said flange and secured to the cross piece, and laterally projecting arms extending along and secured to said sill.

21. In a vehicle body construction of the character described, in combination, body posts, metallic side sills Z-shaped in cross-section, each having a central horizontal portion, an upwardly extending flange along the inner edge of the horizontal portion constituting an attaching medium for the body posts and giving load-carrying strength to the sills, and a downwardly extending flange along the outer edge of said horizontal portion, sheet-metal cross pieces extending across the body and secured at each end to said downwardly extending flange, reenforcing brackets having inwardly projecting arms penetrating the inner flange and laterally projecting arms each overlying and secured respectively to the cross pieces and the horizontal sill portions.

22. In a vehicle body construction, in combination, a body post, a sill member having a horizontal portion and a vertical portion, and a bracket member secured to said horizontal portion and extending within said body post, bracing said post from within, said vertical portion extending without said body post, bracing said post from without, and means securing said bracket, body post and vertical portion together.

23. In vehicle body construction of the character described, in combination, body posts, a plurality of removable body pads, a horizontal seat rail secured to the body posts and having a clip member secured to its rear forming therewith a retaining channel adapted to removably receive the lower edge of said body pads and hold the same in position, and vertical retaining strips overlapping the adjacent edges of said body pads detachably securing said pads to said posts.

24. In a vehicle body construction, in combination, body posts, body pads and a horizontal seat rail of substantially angle-iron form having a groove formed in its exterior corner, a spring-plate secured to the rear of said angle-iron and forming with the corner groove therein a channel cavity, said seat rail and spring plate being secured to the inner side of said body posts, said channel cavity detachably retaining the lower edge of said body pads in position.

This specification signed this 20th day of September, 1924.

CONRAD T. HANSEN.